July 7, 1942. F. NIESEMANN 2,288,733
GAS PRESSURE REGULATOR
Filed April 30, 1940
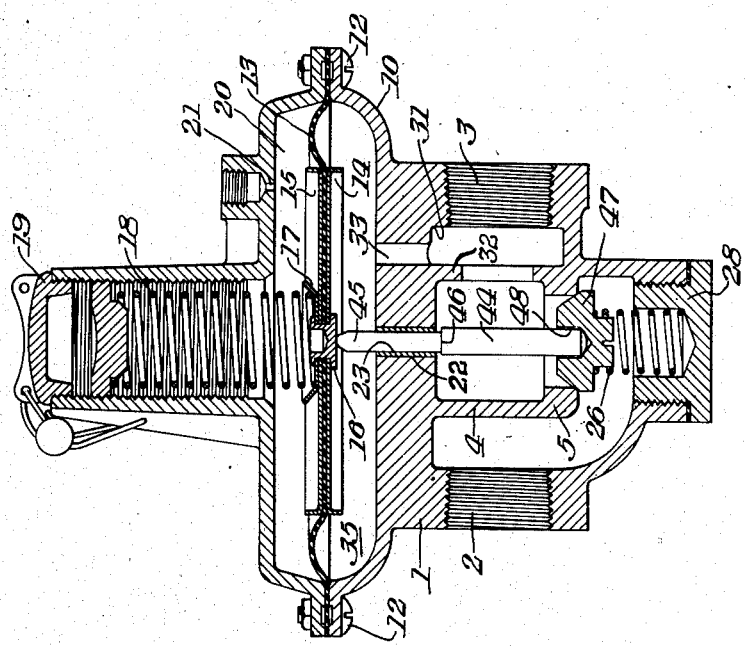
INVENTOR
Fritz Niesemann
BY Lewis D. Konigsford
ATTORNEY Patented July 7, 1942

2,288,733

UNITED STATES PATENT OFFICE 2,288,733

GAS PRESSURE REGULATOR

Fritz Niesemann, Pittsburgh, Pa., assignor to Pittsburgh Equitable Meter Company, Pittsburgh, Pa., a corporation of Pennsylvania Application April 30, 1940, Serial No. 332,529

3 Claims. (Cl. 50—23)

The present invention relates to gas pressure regulators, particularly of the type employed in connection with gas burning appliances.

It is an object of this invention to provide a gas pressure regulator having improved performance and which is inexpensive to manufacture.

A further object is to provide a regulator in which sticking of the valve or diaphragm resulting in erratic operation or hysterisis is eliminated.

Another object is the provision of a regulator in which the cost of manufacture is reduced by eliminating the need for accuracy in certain machining operations.

According to the present invention, I provide a gas pressure regulator in which the diaphragm is separate from the valve and in which the valve stem is guided by a guide bore integral with the valve body, thus allowing the valve seat and valve stem bore to be formed by a single centering operation. In a preferred construction the valve member has a recess therein which receives a separate valve stem with a relatively loose guiding fit to allow limited rocking movement of the valve member to find its seat. I further improve the performance of the regulator by providing a flange adjacent the duct connecting the regulator chamber with the outlet connection.

The invention will be described in greater detail in the following description taken in connection with the accompanying drawing, wherein I have shown the preferred embodiment of my invention by way of example, and wherein the figure is a vertical sectional view of the preferred embodiment.

Referring to the drawing, the body or casing 1 has aligned inlet and outlet connections 2 and 3 respectively, separated by a dividing wall 4 having a horizontal portion 5 with a bore 6 therethrough providing a valve seat at its outer end. Walls 8 of the casing provide a portion of a diaphragm case, indicated generally at 10. The case 10 is composed of upper and lower sections secured together at their peripheries by screws 12 and clamping the outer periphery of a diaphragm 13 therebetween. Reinforcing plates 14, 15 disposed on opposite sides of the diaphragm, are secured in position by a rivet 16 having an enlarged head and passing through the reinforcing plates and riveted on the opposite side. A dished spring retainer or plate 17 is also held in position by said rivet. The spring 18, which loads the diaphragm, is housed in a suitable extension of the upper diaphragm case cover, which is closed by a cap 19, and the upper chamber 20 of the diaphragm is vented to the atmosphere through a suitable vent 21. However, any suitable loading means for the diaphragm may be employed.

The wall 8 of the casing which preferably is integral therewith, is bored at 22 in axial alignment with bore 6, to receive a bushing 23 and serves as a guide for a valve stem 44 extending through the bushing with a working clearance. Valve stem 44 has a reduced portion 45 forming a shoulder or flange 46 and valve member 47 is bored at 48 to receive the stem 44 with a loose fit. Holes 22 and 6 are formed at one centering operation to insure alignment. A kerf may be provided in the end of the valve 47 to facilitate lapping the valve in its seat. The clearance between the stem 44 and the guide bushing 23 may be on the order of about .003 of an inch to about .015 of an inch. A spring 26 in the lower portion of the casing acts against the valve 47 to bias it toward closed position, and the access hole 27 containing the spring is closed by a cover 28 secured to the regulator body by any suitable means.

The valve stem 44 extends through the bushing 23 and abuts the flat head of rivet 16 in the diaphragm. The ends of the stem preferably are rounded. The outlet side of the regulator has a cored recess 31 therein providing an annular or segmental restricting wall or flange 32 on the upstream side thereof, and a passage 33 having an area at least three times greater than the clearance area between the stem 44 and bushing 23 is formed through the outer wall of the casing and the diaphragm casing and communicates with the pressure responsive chamber 35 of the regulator whereby the diaphragm becomes responsive to the outlet pressure.

The operation of the regulator now will be described. The spring 18 provides a predetermined load on the diaphragm 13 and urges the diaphragm 13 against the valve stem 44 so that when the pressure in chamber 35 is insufficient to overcome the load of the spring on the diaphragm the diaphragm descends and opens the valve 47. The pressure in the outlet of the regulator is communicated by duct 33 to the pressure responsive chamber 35 so that the regulator chamber 35 is responsive to the outlet pressure, and the provision of the flange 32 acting as an obstruction to flow and duct 33 causes an aspirating action which lowers the pressure in chamber 35 somewhat with relation to the outlet pressure and improves the regulator performance. As the regulator stem is separate from the diaphragm, any cocking of the diaphragm will not cock the valve stem and thus any binding action of the stem in its guide is eliminated. The spring 26 causes the valve 47 to follow the diaphragm in its vertical movements, and by providing a flat bearing 16 and a rounded end for the valve stem, the diaphragm is free to move slightly transversely of the stem axis without affecting the alignment of the stem and valve seat. A further advantage of this construction is that the regulator valve may be tested for lockup action without the diaphragm in place, with the assurance that when the diaphragm is assembled to the regulator it will not change the lockup action in any way. The separation of the valve from the diaphragm also simplifies the assembly of the regulator.

The provision of the shoulder 46 in this construction acts as a stop to limit the stem motion so that if the diaphragm rises excessively the stem will not fall out of the recess in the valve, and by having the valve stem loose from the valve, the valve is allowed to rock slightly and thus find its own seat. Thus, it is not necessary that the guide bore 23 be in absolutely accurate alignment with the valve seat. This construction results in a further improved lockup action of the regulator.

Having described my invention, what I claim as my invention and desire to secure by United States Letters Patent is:

1. A regulator comprising a valve casing having inlet and outlet connections separated by a perforate dividing wall providing a valve seat, and having an integral wall opposite said dividing wall with a guide bore therein and a second wall on the opposite side of said dividing wall, a diaphragm cover secured to said casing and having a diaphragm therein providing a pressure responsive chamber, a duct extending through the wall of the pressure responsive chamber into the outlet connection, a valve member having a recess therein co-operating with said valve seat for controlling flow through said perforation, a valve stem extending through said guide bore into said valve recess with a relatively loose guiding fit to allow limited rocking movement of the valve member to find its seat, means to load said diaphragm, and a spring interposed between said valve and said second wall, the valve member being guided solely by said valve stem when off its seat.

2. A regulator comprising a valve casing having inlet and outlet connections separated by a perforate dividing wall providing a valve seat and having an integral wall opposite said dividing wall with a guide bore therein and a second wall on the opposite side of said dividing wall, a diaphragm cover secured to said casing and having a diaphragm therein providing a pressure responsive chamber, a duct extending through the wall of the pressure responsive chamber into the outlet connection, a valve member having a recess therein co-operating with said valve seat for controlling flow through said perforation, a valve stem extending through said guide bore into said valve recess with a relatively loose guiding fit to allow limited rocking movement of the valve member to find its seat, a projection on said stem adjacent the guide bore to prevent upward movement of the valve stem sufficient to separate the stem and valve member; means to load said diaphragm, and a spring interposed between said valve and said second wall, the valve member being guided solely by said valve stem when off its seat.

3. A regulator comprising a valve casing having inlet and outlet connections separated by a perforate dividing wall providing a valve seat and having an integral wall opposite said dividing wall with a guide bore therein and a second wall on the opposite side of said dividing wall, a diaphragm cover secured to said casing and having a diaphragm therein providing a pressure responsive chamber, a duct extending through the integral wall into the outlet connection, a flange adjacent said duct on the upstream side thereof providing a restriction, a valve member having a recess therein co-operating with said valve for controlling flow through said perforation, a valve stem extending through said guide bore into said valve recess with a relatively loose guiding fit to allow relatively free movement of the valve member to find its seat, means to load said diaphragm, and a spring interposed between said valve and said second wall, the valve member being guided solely by said valve stem when off its seat.

FRITZ NIESEMANN.